Oct. 13, 1964   F. L. GALLAGHER ETAL   3,152,921
MASKING PAPER HAVING A RUGOSE COATING OF RUBBER LATEX
Filed June 27, 1961

United States Patent Office 3,152,921
Patented Oct. 13, 1964

3,152,921
MASKING PAPER HAVING A RUGOSE COATING OF RUBBER LATEX
Frank L. Gallagher, Yardley, Pa., and Peter T. Spottiswoode, Weston, and Norton L. Sherman, Newton, Mass., assignors of one-half to Rohm & Haas Company, Philadelphia, Pa., a corporation of Delaware, and one-half to St. Regis Paper Company, New York, N.Y., a corporation of New York
Filed June 27, 1961, Ser. No. 119,784
8 Claims. (Cl. 117—68.5)

This invention relates to masking papers or films for sheets and other objects made from acrylic-type resins.

Products made from acrylic-type resins, such as methyl methacrylate and the like, are prone to be scratched or otherwise marred. When this occurs, the transparency, optical clarity, or consumer appeal is greatly diminished. As a result, it has long been the practice to protect the surfaces of such plastic materials by masking papers in order to keep them free of dirt, grit and other abrasives which may damage them while shipping, storing, fabricating, assembling, or other handling of the products.

Until now, the type of masking paper most commonly used was one coated with a tacky, pressure-sensitive, adhesive composition made from polyisobutylene, an antiadhesive transfer agent, and preferably an extender such as mineral oil. An aliphatic, low-boiling, hydrocarbon solvent, which was evaporated after the coating was applied to the paper, was also included in the composition. U.S. Patent No. 2,463,452 describes such a paper.

Although such prior art masking papers work satisfactorily for most short-term applications, in a number of situations they are quite troublesome. Upon periods of aging, for instance, the adhesion to the plastic surface is frequently so great that it may take an hour or even much more time to strip the paper from a surface only two feet square. Even after thus stripping the paper, the user's troubles are not over, for objectionable, oily, and sticky residues generally will be found to remain. The plastic itself often will be found to have been attacked, the severity of the damage depending upon the length of time the aging has taken place. If exposed to sunlight for several days, or to accelerated sunlight tests, the masking paper will act the same in all these adverse respects as if it had been allowed to age on the plastic for a long period, e.g., six months or a year. Another defect is the impossibility of restoring the bond of the paper to the plastic surface, by simply pressing the two together once the bond is broken, as by raising a corner of the paper from the surface.

Broadly stated, the principal object of the present invention is to overcome all of these disadvantages.

More specifically, a major object is to provide a masking paper which will inhere to and thereby protect the surfaces of articles made from acrylic-type resins, said paper to have a coating composition which is substantially non-tacky, unlike most adhesives, and which will permit rapid stripping of the paper from the masked surface without leaving any residue from the adhesive composition on the plastic.

Other objects will be apparent from the description and the accompanying drawing of the invention in which.

Figure 1:
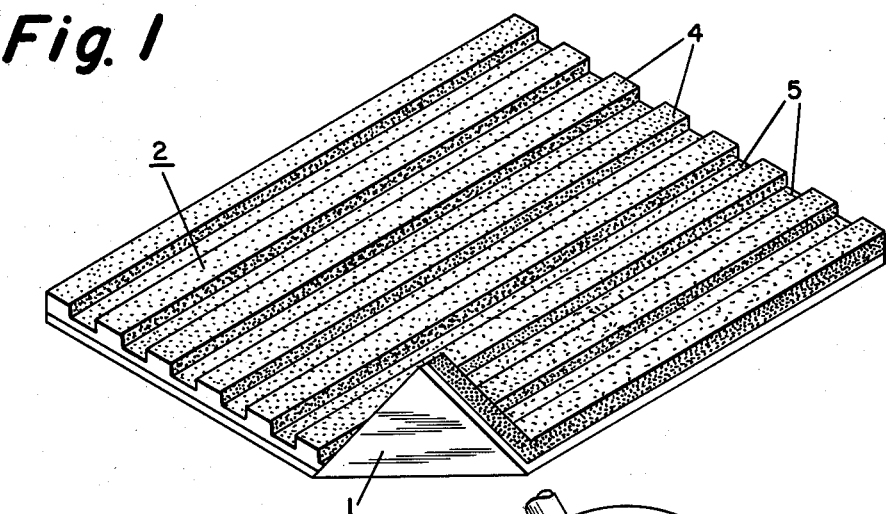
FIGURE 1 is a perspective of a piece of the masking paper having a continuous rugose latex coating on the side which is to be in contact with the plastic it will cover.
Figure 2:
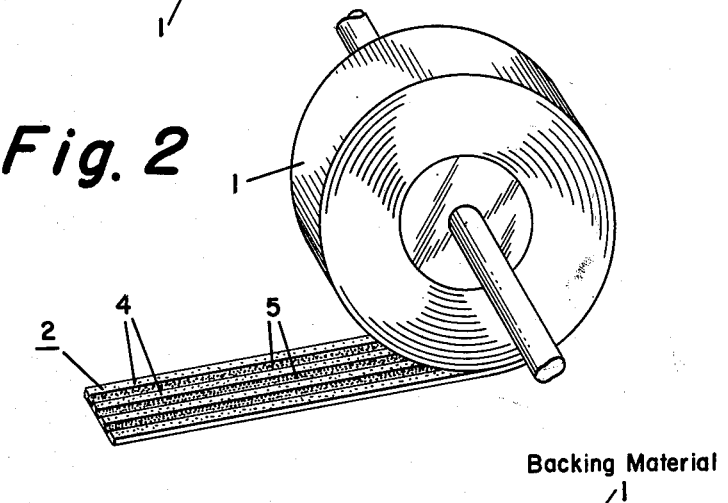
FIGURE 2 is an end view of a roll of the novel masking paper, the roll having been loosened so that the separate layers of the flat paper surface and the rugose latex surface thereon can be readily distinguished one from another.
Figure 3:
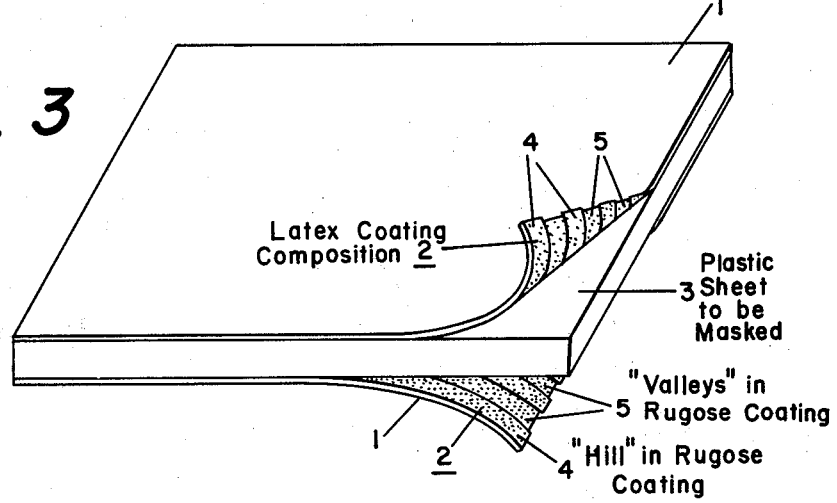
FIGURE 3 is a view of a piece of methyl methacrylate plastic sheet having the masking paper of this invention covering both surfaces except where the paper has been peeled back to show the underlying plastic.

The above objects are made the more difficult to accomplish by virtue of the surface characteristics of the acrylic sheet to which the masking paper is applied. For this reason certain specifications for the product of the present invention, as set forth below, must be complied with strictly or else the results will not be satisfactory. Where some latitude exists, that fact will be spelled out so that there will be no basis for misunderstanding.

Illustratively, the present invention is described herein as an improved masking paper. It will be understood, however, that other backing materials may be used as a base for a coating thereon, examples being glassine, cellophane, and other exceedingly smooth films. Preferably, the invention is accomplished by applying a substantially non-tacky latex coating composition to a relatively non-stretch, high wet strength backing material 1, such as 25 to 50 pound kraft paper. At least one side of the paper must have a very smooth, machine-glazed or polished finish. On this side there is applied the coating composition 2 which will come in contact with the surface of the plastic 3 to be masked. The other side of the paper, which is treated with a rubber release agent, preferably has a non-polished or normal machine finish.

The preferred coating composition is a compounded, centrifuged, natural rubber latex, primarily preserved by ammonia and naturally occurring fatty or rosin acids and at a solids content of about 60%. The compounding may be done with ultraviolet absorbents and anti-oxidants, of types well known to the art, for protection of the deposited film, as well as penetrants and stabilizers, together with suitable viscosity control agents and antifoams. One such product is composition 1-S-134 produced by the General Latex and Chemical Corporation of Cambridge, Massachusetts. The latex preferably is mechanically worked to make it plastic and substantially non-tacky in nature and then may be applied to the paper in any well-known manner, as by means of a doctor blade or by other suitable mechanical apparatus (not shown).

Other latex coating compositions may suitably be employed. Which ever composition is used, it is essential that the latex be applied to the paper in a prescribed manner governing the quantity and the manner of distribution of the coating on the paper surface. There must, for example, be at least about 9 pounds of the coating per 3,000 square feet of paper. Less than 9 pounds results in a product which is relatively useless insofar as the present invention is concerned. A preferred working range is on the order of 12–13 pounds per 3,000 square feet. Amounts in execess of 13 pounds may be used, but, as no better result is achieved, it may be uneconomical to do so. As for getting the desired quantity of latex on the paper, there is no problem, as there are devices which are well known to the coated-papermaking art that may be employed to meter the correct amount of latex to the paper.

A critical factor in the successful operation of the invention is the application of the latex in such a way as to form a continuous rugose coating as shown in the drawings. The rugated latex coating, moreover, must be relatively free of voids or bubbles, especially if those breaks or interruptions to the continuous latex film are larger than about 10 microns in diameter or cross-section. The "hills" 4 and "valleys" 5 which are formed preferably should be present in a fairly uniform pattern or design and may conveniently be in relatively parallel rows running lengthwise of the paper. They must be present in substantially every part of the paper surface and preferably in such number as to provide upwards of 50 rows per inch.

The thickness of the coating, i.e., the height of the "hills" or the "depths" of the "valleys," also is a most important factor in getter the paper to inhere to the acrylic sheet. A preferred average thickness at the valleys is about 14 to 16 microns, and at the hills it is about 22 to 24 microns. In any event, these dimensions must range between about 10 to 28 microns for the invention to function properly.

The formation of the rugose surface on the continuous latex coating may be done in any of a number of ways well known to the art. One is the use of a rugated roller or doctor blade, such device being rolled or drawn across the latex coating so as to form the rugose pattern. The amount of pressure applied by these devices against the latex may be varied with the nature of the coating composition, i.e., its resistance to the application of any force, and the height and depth desired for the hills and valleys in the composition. This, in turn, will depend in part upon the porosity of the paper. For all practical purposes, the latex coating must be deposited on the polished surface of the paper rather than sorbed. In practice, the simplest way to determine the right amount of pressure to employ is to test a few sample applications. The object, in most cases, should be to provide a coating in which the "hills" are within the limits described above.

The rubber release agent may suitably be a water dispersion of a metallic soap or a concentrated solution of chrome complex (a Werner type chromium compound) in isopropanol such as is disclosed in U.S. Patent No. 2,273,040. Such compositions comprise a complex compound of the Werner type in which a trivalent nuclear chromium atom is coordinated with an acrylic acido group having at least ten carbon atoms. The function of the release agent is to permit the coated paper to be rolled up without the coating composition becoming attached to the uncoated rough back surface of the paper, as by being pressed into the pores thereof. As a rule, the amount of release agent that is used is not critical except that it should be in sufficient quantity to coat thinly the entire surface of the paper which does not have the latex thereon.

Release agents generally used with adhesive compositions, such as are typified by the composition disclosed in U.S. Patent No. 2,803,557, seal fibers against creep of an adhesive composition into the fibers. As employed in the present invention, the release agent permits such creeping to take place. One requirement for the release agent is that it be applied to the paper, as described above; it cannot be incorporated in the latex composition, for it then will not work in accordance with the present invention.

The paper, besides being of a high wet strength category, must be stable against shrinkage. Failure to have these properties results in movement of the paper on the roll and separation of the latex coating from the paper. When applied to the acrylic surace to be masked, unsightly wrinkles, loose folds, curling and even unmasking will occur if there is an unstable condition. To prevent these problems the paper is tested at 20% relative humidity and packaged so as to maintain essentially the same conditions which prevailed when manufactured. Methods for maintaining the proper humidity and for protecting the coating from being overly dried upon contact with air are well known to the art and illustratively explained in U.S. Patent 2,432,075.

It should be understood that the release agent or any other component of the coating composition must not be such as would in any way attack acrylic-type plastics. Further, it should be understood that the term "acrylic-type resin or plastics" as used herein refers to such materials as are made by polymerizing acrylic or methacrylic esters, acids and anhydrides, and copolymers thereof. Polymerized methyl methacrylate is a common example of these materials, although other lower saturated aliphatic esters of acrylic and methacrylic acid are frequently used either alone or as a component of a copolymer with acrylic or methacrylic acid, or acrylic or methacrylic anhydride, or other esters of acrylic or methacrylic acid which tend to give a plastic of increased hardness or some other desirable property.

Masking sheets made in accordance with this invention have been found in long usage to hold smoothly and tenaciously to such plastic surfaces, never "wrinkling" as by detachment from the plastic, and yet were stripped therefrom easily and cleanly in just a few seconds per square yard. Prolonged exposure to many months of sunlight, heat, humidity and other adverse atmospheric conditions, did not destroy the neat, tight-fitting bond of paper to plastic. When acrylic-type plastic sheets bearing the masking paper of this invention were cut with band or power saws, as is the practice by persons utilizing this material for building and other purposes, the paper remained in the same tight-fitting relationship to the plastic surface at the newly cut edges.

Minor modifications of the invention will suggest themselves to those skilled in the art, and it is therefore to be understood that the invention is not to be limited just to the specific embodiments thereof described herein, except as defined in the following claims.

We claim:

1. A masking sheet which can inhere to and thereby protect acrylic-type plastic articles but is readily and cleanly removable therefrom when so desired, comprising a flexible, substantially dimensionaly stable flat paper material having a first and a second side and a substantially non-tacky coating of rubber on said paper material's first side formed from compounded and centrifuged rubber latex so as to be substantially continuous and have a rugose surface formed thereon, the rubber latex being applied to the paper material on the basis of at least about 9 pounds of the coating per 3,000 square feet of the paper material so as to present a fairly uniform pattern of relatively parallel rows covering substantially every part of the masking sheet in such number as to provide upwards of about 50 rows per inch, the rugose coating further having a thickness varying from about 10 microns at the points thereof which are closest to the paper material to about 28 microns at the points which project farthest from the paper material.

2. The masking sheet of claim 1 in which a rubber release agent is applied to the paper material's second side for preventing the coating composition from bonding with the coated first side when the coated masking sheet is rolled upon itself.

3. The masking sheet of claim 1 in which the continuous rubber coating is free of voids and bubbles any larger than about 10 microns in cross-section.

4. The masking sheet of claim 1 in which the latex is applied to the paper material on the basis of between about 12 and about 13 pounds of the coating per 3,000 feet of the paper material.

5. The masking sheet of claim 1 in which the continuous rugose coating has a thickness varying from about 14–16 microns at the points thereof which are closest to the paper material to about 22–24 microns at the points thereof which project farthest from the paper material.

6. The masking sheet of claim 1 in which the coating composition essentially consists of a substantially non-tacky, centrifuged and compounded natural rubber latex which has been worked to make it plastic in nature.

7. The masking sheet of claim 2 in which the rubber release agent is a metallic soap.

8. The masking sheet of claim 2 in which the rubber release agent is a composition comprising a complex compound of the Werner type in which a trivalent nuclear atom is coordinated with an acrylic carboxylic acido group having at least 10 carbon atoms.

References Cited in the file of this patent
UNITED STATES PATENTS

| | | |
|---|---|---|
| 1,660,204 | Moses | Feb. 21, 1928 |
| 1,982,018 | Owen | Nov. 27, 1934 |
| 2,061,748 | Angier | Nov. 24, 1936 |
| 2,432,074 | Jennings | Dec. 2, 1947 |
| 2,648,614 | Martin et al. | Aug. 11, 1953 |
| 2,651,857 | Griswold et al. | Sept. 15, 1953 |
| 2,741,564 | Mahler | Apr. 10, 1956 |
| 2,803,560 | McIntyre et al. | Aug. 20, 1957 |
| 2,867,317 | Vogt | Jan. 6, 1959 |
| 2,883,303 | Jennings | Apr. 21, 1959 |